(12) United States Patent
Duan et al.

(10) Patent No.: US 7,627,930 B2
(45) Date of Patent: *Dec. 8, 2009

(54) AUTOMATICALLY OPENING HINGE ASSEMBLY FOR PORTABLE ELECTRONIC DEVICES

(75) Inventors: Chao Duan, Shenzhen (CN); Ying-Liang Tu, Shenzhen (CN); Chia-Hua Chen, Tu-cheng (TW); Shun Guo, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 519 days.

This patent is subject to a terminal disclaimer.

(21) Appl. No.: 11/384,471

(22) Filed: Mar. 20, 2006

(65) Prior Publication Data
US 2006/0242795 A1    Nov. 2, 2006

(30) Foreign Application Priority Data
Apr. 29, 2005    (CN) ........................... 200520057961

(51) Int. Cl.
*E05D 11/10* (2006.01)

(52) U.S. Cl. ........................ 16/330; 16/303; 16/326

(58) Field of Classification Search ............ 16/337–339, 16/342, 330, 303, 374, 376, 377, 340; 361/680–683, 361/814; 455/90.3, 575.1, 575.3, 575.8; 379/433.12, 433.13; 348/373, 333.01, 333.06, 348/794

See application file for complete search history.

(56) References Cited

U.S. PATENT DOCUMENTS

| 6,148,480 | A  | * | 11/2000 | Cooke ........................ 16/303 |
| 7,007,345 | B2 | * | 3/2006 | Nakase et al. ................. 16/330 |
| 7,124,472 | B2 | * | 10/2006 | Duan et al. .................... 16/303 |
| 7,237,304 | B2 | * | 7/2007 | Duan et al. .................... 16/324 |
| 7,353,568 | B2 | * | 4/2008 | Duan et al. .................... 16/330 |
| 2006/0242796 | A1 | * | 11/2006 | Duan et al. .................... 16/330 |
| 2006/0254026 | A1 | * | 11/2006 | Duan et al. .................... 16/330 |
| 2008/0034541 | A1 | * | 2/2008 | Duan et al. .................... 16/330 |

* cited by examiner

*Primary Examiner*—Chuck Y. Mah
(74) *Attorney, Agent, or Firm*—Steven M. Reiss (57) ABSTRACT

A hinge assembly (200) includes a button (3), a retaining member (4), a fixing seat (5), a control member (6), a first spring (7), a follower (10), a cam (30), a second spring (9) and a shaft (20). The button has at least one pushing portion (31). The control member has at least one receiving groove (61), and the pushing portion is received in each receiving groove. Each pushing portion resists the control member. The first spring provides an elastic force to the control member. The cam includes a cam hole having an inner screw thread (342). The second spring provides an elastic force to make the cam and the follower resist each other. The shaft defines an outer screw thread (233). The outer screw thread engages with the inner screw thread of the cam.

19 Claims, 8 Drawing Sheets

AUTOMATICALLY OPENING HINGE ASSEMBLY FOR PORTABLE ELECTRONIC DEVICES

CROSS-REFERENCE TO RELATED APPLICATIONS

This application is related to two co-pending U.S. patent application Ser. Nos. 11/384,462 & 11/384,472, both entitled "AUTOMATIC OPENING HINGE ASSEMBLY FOR FOLDABLE ELECTRONIC DEVICES", by Chao Duan et al. Such applications have the same assignee as the instant application and have been concurrently filed herewith. The disclosure of the above identified applications is incorporated herein by reference.

BACKGROUND OF THE INVENTION

1. Field of the Invention

The present invention relates to hinge assemblies and, particularly, to an automatically opening hinge assembly for foldable devices such as portable telephones, portable computers, and so on.

2. Discussion of the Related Art

At present, perhaps the most popular portable electronic device in the marketplace is the foldable cellular telephone, which generally includes a cover section and a body section. The cover section and the body section are rotatably interconnected through a hinge assembly, for switching the telephone between an in-use position and a closed position.

One kind of hinge assembly employs a cam and a follower, which makes the cover section fold outwards from the body section and then hold in an open position. The hinge assembly typically includes a cam having a concave portion, a follower having a convex portion, a shaft having a fixing end, and a spring. The cam and the follower are placed around the shaft. The spring resists the follower to make the concave portion tightly contact the convex portion. The cam, the follower, the shaft and the spring are received in a housing. A flip cover rotates about a main body of the mobile phone by overcoming the force of the spring, thus making the concave portion rotate about the convex portion. However, a user must open the mobile phone using both hands. This makes the mobile phone awkward to utilize in situations when the user has only one hand free.

Therefore, a new hinge mechanism is desired in order to overcome the above-described problems.

SUMMARY OF THE INVENTION

An automatic opening hinge assembly for devices such as foldable cellular phones is provided.

One embodiment of the present hinge assembly includes a button, a retaining member, a fixing seat, a control member, a first spring, a follower, a cam, a second spring and a shaft. The button has at least one pushing portion. The retaining member has a button hole defined therein. The fixing seat has at least one block, and each pushing portion passes through the fixing seat. The control member has at least one receiving groove, and the pushing portion is received in each receiving groove. Each pushing portion resists the control member. The first spring provides an elastic force to the control member. The follower has a cam surface. The cam has a latching cam surface, and the cam includes a cam hole having an inner circumferential wall. The inner circumferential wall defines an inner screw thread. The second spring provides an elastic force to make the cam surface of the follower and the latching cam surface of the cam resist each other. The shaft has an end shaft, and the end shaft defines an outer screw thread. The outer screw thread engages with the inner screw thread of the cam.

Other advantages and novel features of the present hinge assembly will become more apparent from the following detailed description when taken in conjunction with the accompanying drawings.

BRIEF DESCRIPTION OF THE DRAWINGS

Many aspects of the hinge assembly can be better understood with reference to the following drawings. The components in the drawings are not necessarily to scale, the emphasis instead being placed upon clearly illustrating the principles of the present hinge assembly. Moreover, in the drawings, like reference numerals designate corresponding parts throughout the several views.

DETAILED DESCRIPTION OF THE EMBODIMENTS

Figure 1:
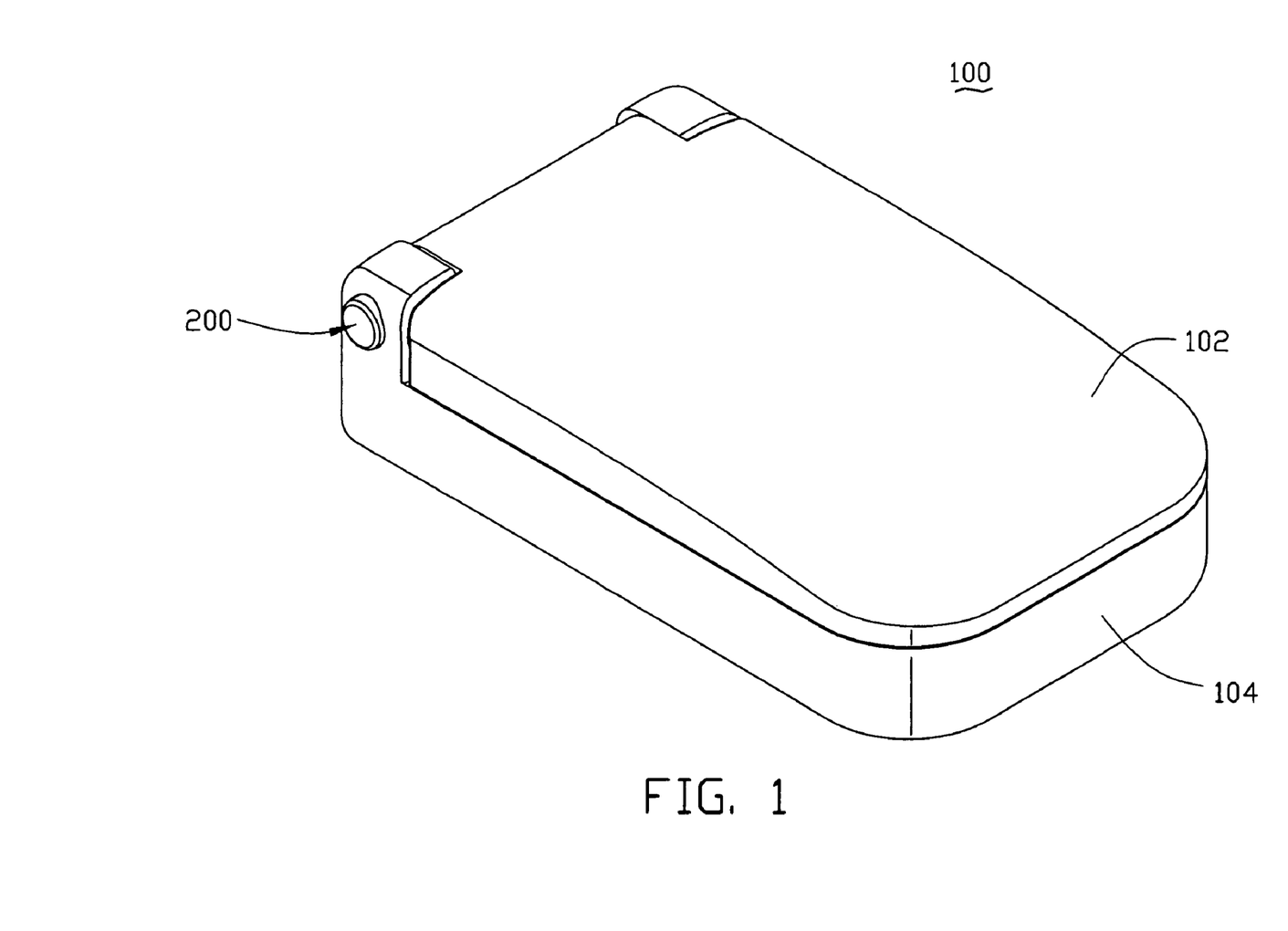
FIG. 1 is an isometric view of an embodiment of the present hinge assembly, as used in a mobile phone.

Referring now to the drawings in detail, FIG. 1 shows a hinge assembly 200, applied to a foldable electronic device 100 such as a flip type mobile phone, for pivotably coupling a cover section 102 and a body section 104. It is to be understood, however, that the hinge assembly 200 could be advantageously used in other environments (e.g. cabinet doors). As such, although proving particularly advantageous when used in foldable electronic devices, the hinge assembly 200 should not be considered limited in scope solely to an intended use environment of foldable electronic devices.

Figure 2:
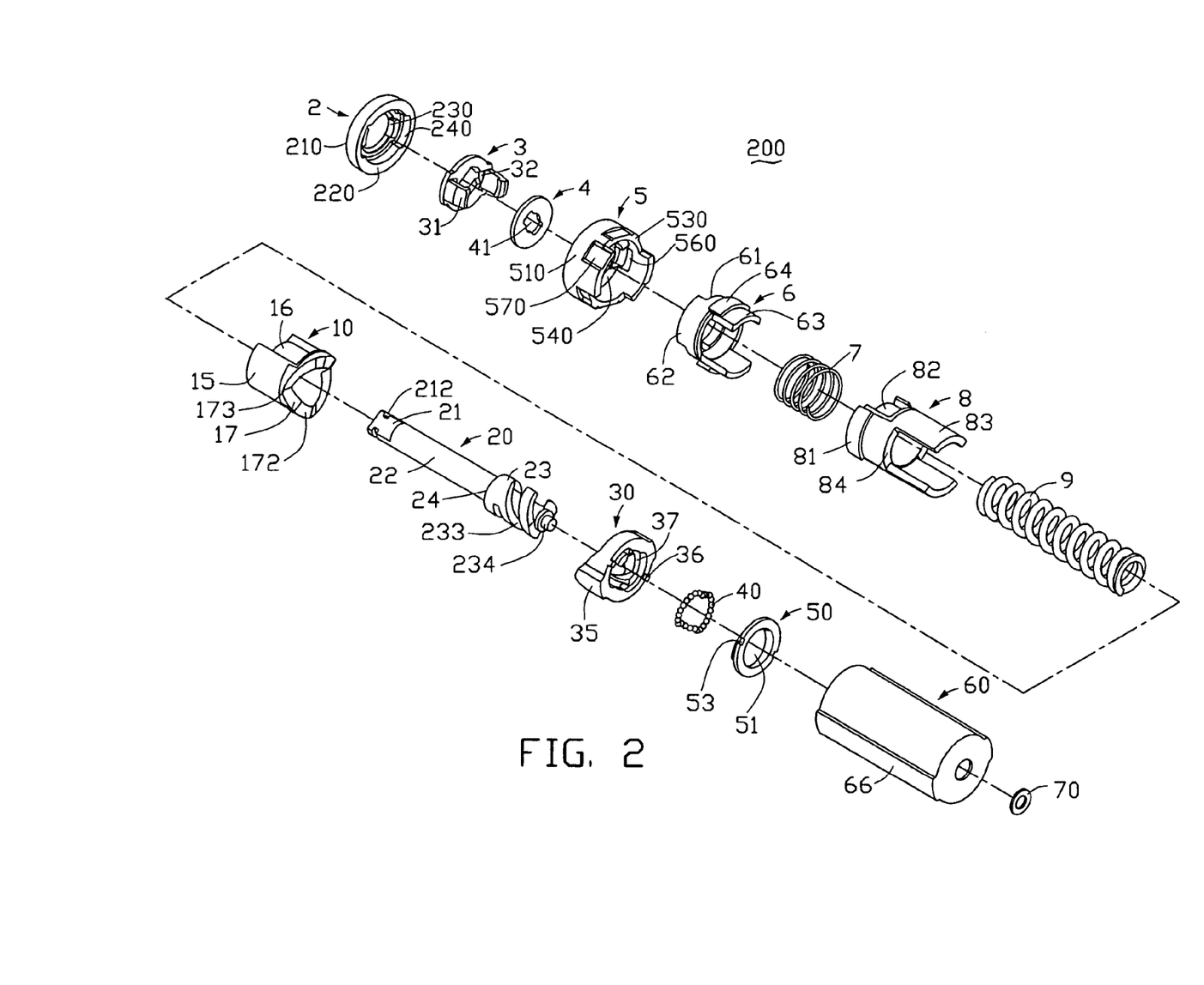
FIG. 2 is an exploded, isometric view of the embodiment of the hinge assembly shown in FIG. 1.
Figure 3:
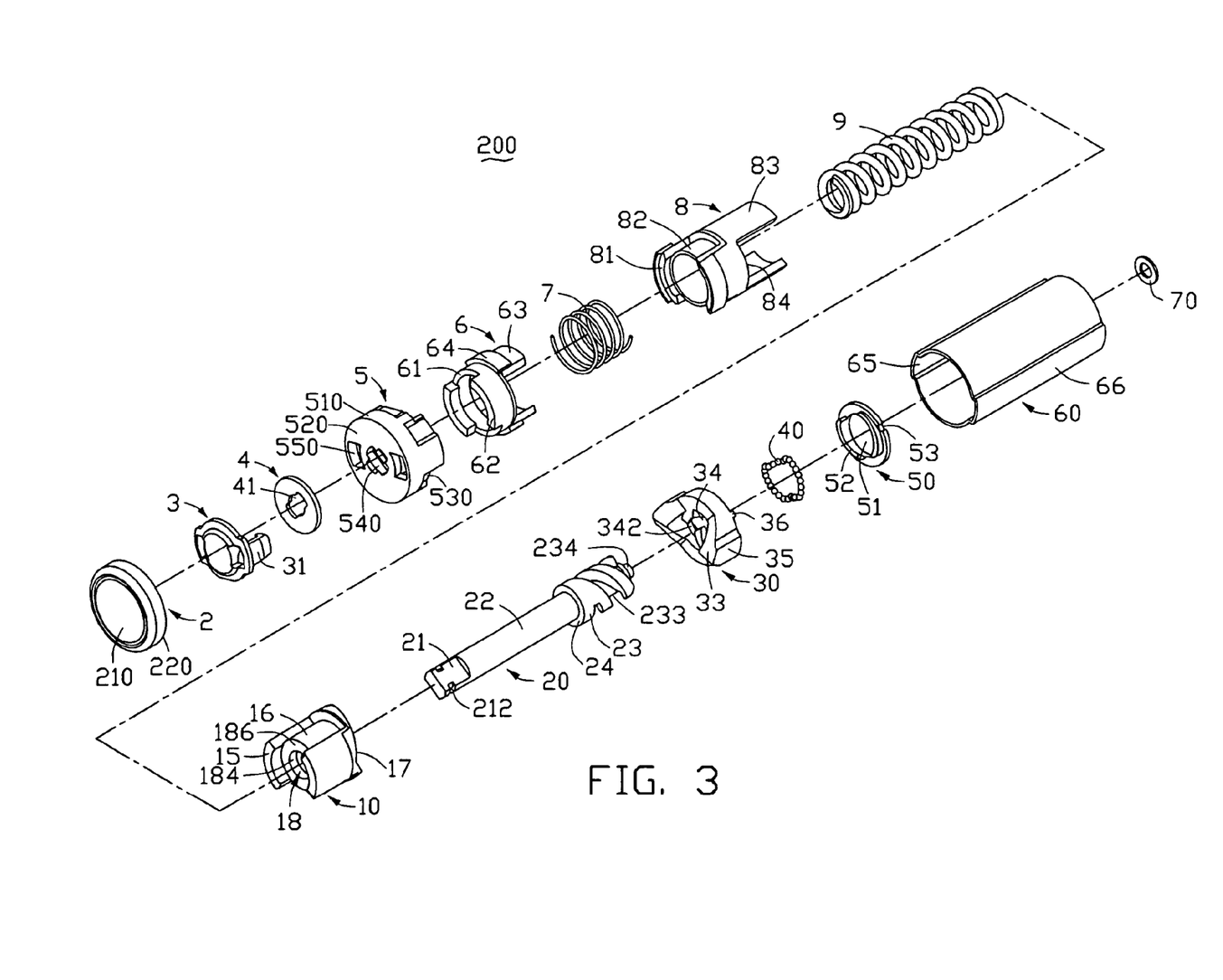
FIG. 3 is similar to FIG. 2, but viewed from another aspect.

Referring to FIGS. 2 and 3, the hinge assembly 200, in the embodiment illustrated, includes a cap 2, a button 3, a retaining member 4, a fixing seat 5, a control member 6, a first spring 7, a locking member 8, a second spring 9, a follower 10, a shaft 20, a cam 30, a set of ball bearings 40, a latching ring 50, a sleeve 60 and a washer 70. The cap 2, the button 3, the retaining member 4, the fixing seat 5, the control member 6, the first spring 7, the locking member 8, the second spring 9 and the follower 10 are placed, in that order, to surround the shaft 20 from one end thereof The cam 30, a set of ball bearings 40 and the latching ring 50 are placed to surround at an opposite end of the shaft 20, adjacent to the follower 10. The sleeve 60 receives the above-mentioned elements. The washer 70 is fixed on the opposite end of the shaft 20. The hinge assembly 200 is thus integrated into a whole.

The cap 2 is substantially a hollow disk with a closed end 210 and an open end 220. The cap 2 has two opposite protrusions 230 formed in an inside circumferential wall thereof and extending between the closed end 210 to the open end 220. The cap 2 has two opposite cap grooves 240 defined at the open end 220 thereof The protrusions 230 are aligned with the cap grooves 240.

The button 3 is substantially a board, and the configuration of the button 3 is corresponding to the grooves 240. As such, the button 3 is received in the grooves 240 of the cap 2. In the present embodiment, the button 3 may be attached to the cap 2 and be fixed together. The button 3 has two opposite claws 31 extending from one end thereof opposite to the cap 2. The button 3 has a button hole 32 defined in a central area thereof, and the protrusions 230 of the cap 2 may be locked into the button hole 32.

The retaining member 4 is substantially disk-shaped, and has a deformed hole 41 defined in a middle thereof.

Figure 4:
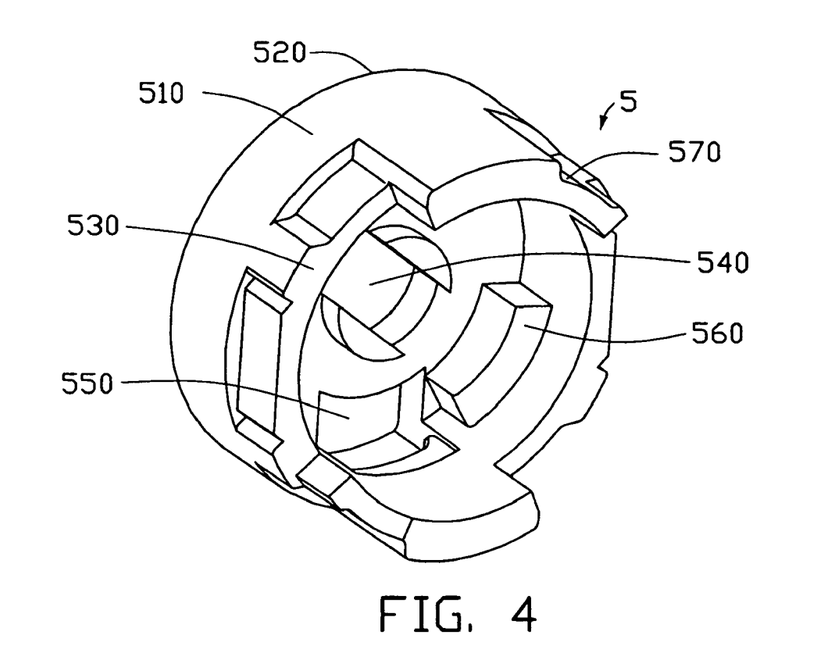
FIG. 4 is an enlarged view of the base seat in FIG. 2.

Referring also to FIG. 4, the fixing seat 5 is substantially cylindrical in shape, and includes an open end and an opposite closed end. The fixing seat 5 has an outside circumferential wall 510 and a bottom wall 520 connected with the outside wall 510. The outside circumferential wall 510 has two symmetrical openings 530 defined at the open end thereof The bottom wall 520 has an axis hole 540 defined in a center thereof. Two symmetrical slots 550 are defined in the bottom wall 520 adjacent to the axis hole 540, and the claws 31 of the button 3 are received in the slots 550. The bottom wall 520 has two blocks 560 extending from the closed end toward the open end thereof The blocks 560 are adjacent to the two slots 550 and against the outside circumferential wall 510. Several reversing grooves 570 are defined in the outside circumferential wall 510, so that the fixing seat 5 can be fixedly retained in the body section 104 of the foldable electronic device 100.

The control member 6 is a substantially hollow cylinder and defines two opposite receiving grooves 61, with two opposite latching walls 62 formed at one end thereof The blocks 560 of the fixing seat 5 engage in the receiving grooves 61 and the latching walls 62 are locked between the blocks 560, thereby locking the control member 6 and the fixing seat 5 together. The control member 6 has two opposite protruding posts 63 extending from an opposite end thereof Two ribs 64 are formed on an outer periphery of the protruding posts 63. The ribs 64 are received into the openings 530 of the fixing seat 5 so that the latching wall 62 may be engaged between the blocks 560 of the fixing seat 5. An inner diameter of the latching wall 62 is smaller than that of a cylindrical body of the control member 6.

The first spring 7 is a cylindrical spring. A diameter of the first spring 7 is approximately the same as that of the cylinder body of the control member 6, while the diameter of the first spring 7 is larger than the inner diameter of the latching walls 62, thereby one end of the first spring 7 resisting the latching wall 62 of the control member 6 at one end.

The locking member 8 is a substantially hollow cylinder in shape, and has two opposite stepped walls 81 disposed in a circumferential wall thereof. Two latching grooves 82 are defined between the stepped walls 81. The protruding posts 63 of the control member 6 may be locked into the latching grooves 82 so that the control member 6 is fixed with the locking member 8. An inner diameter of the stepped walls 81 is smaller than that of the first spring 7, and an outer diameter of the stepped walls 81 is larger than that of the first spring 7, thereby an opposite end of the first spring 7 resists the stepped wall 81 of the locking member 8. The locking member 8 has two extending walls 83 opposite to the stepped wall 81. Thus, two recesses 84 between the extending walls 83 are formed.

The second spring 9 is substantially a cylinder (i.e., occupying a cylindrical volume). The spring 9 is placed around the shaft 20. One end of the second spring 9 resists the bottom wall 520 of the fixing seat 5. A diameter of the second spring 9 is smaller than the diameter of the second spring 9 so that the second spring 9 may pass through the first spring 7.

The follower 10 is substantially cylindrical in shape. Two latching portions 15 extend from one end of the follower 10. Two notches 16 are defined between the latching portions 15. The latching portions 15 may be engaged into the recesses 84 of the locking member 8, and the extending walls 83 of the control member 8 may be engaged into the notches 16. Accordingly, the follower 10 and the locking member 8 are locked together and cannot rotate relative to each other. The other end of the follower 10 has a cam surface 17 which includes two peaks 172 and two valleys 173. The follower 10 has a stepped hole 18 defined in a center thereof The stepped hole 18 includes a larger diameter hole 182 and a smaller diameter hole 184. The larger diameter hole 182 is adjacent to the cam surface 17 and the smaller diameter hole 184 is adjacent to the latching portions 15. Thus, a follower step 186 between the larger diameter hole 182 and the smaller diameter hole 184 is formed. Accordingly, another opposite end of the second spring 9 resists the follower step 186.

The shaft 20 sequentially includes a deformed shaft 21, a middle shaft 22 and an end shaft 23. A sectional configuration of the deformed shaft 21 is non-circular. A distal end of the deformed shaft 21 has an annular groove 212, and the retaining member 4 is locked into the annular groove 212. The middle shaft 22 is cylindrical in shape, and a step 24 is formed between the end shaft 23 and the middle shaft 22. The end shaft 23 defines an outer thread 233 and includes a resisting end 234.

Figure 5:
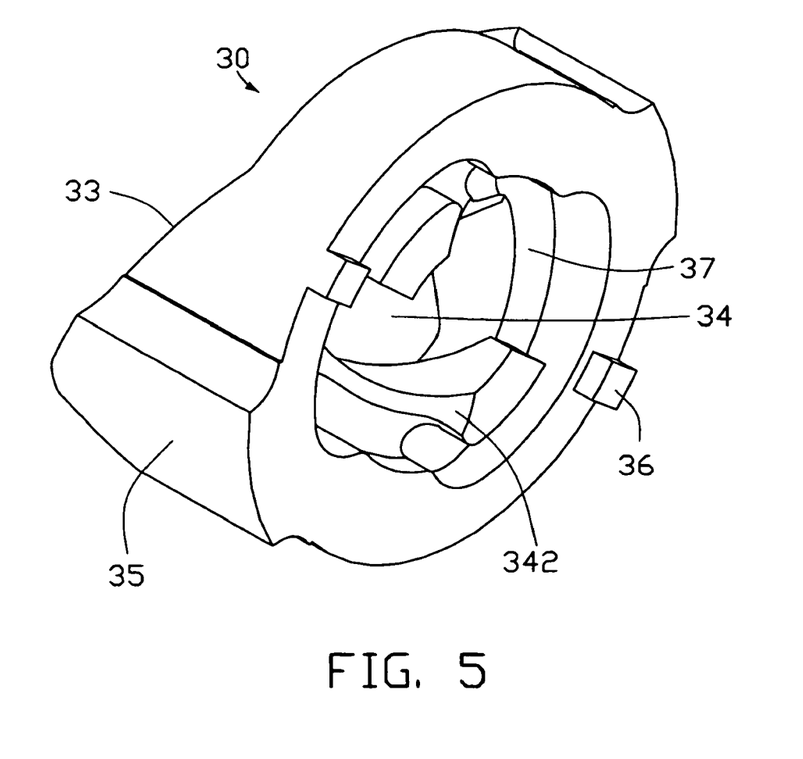
FIG. 5 is an enlarged view of the cam in FIG. 2.

Referring also to FIG. 5, the cam 30 is substantially cylindrical in shape. One end of the cam 30 has a latching cam surface 33, which engages with the cam surface 17 of the follower 10. The other end of the cam 30 has two projections 36. The cam 30 has an axis hole 34 defined in a center thereof, and an inner thread 342 is defined in an inner wall of the cam 30. The cam 30 has two opposite engaging protrusions 35 longitudinally extending from an outer circumferential wall. The inner thread 342 of the cam 30 has a containing groove 37 at another opposite end.

The set of ball bearings 40 are steel balls. The ball bearing 40 is received in the containing groove 37 of the cam 30.

Figure 6:
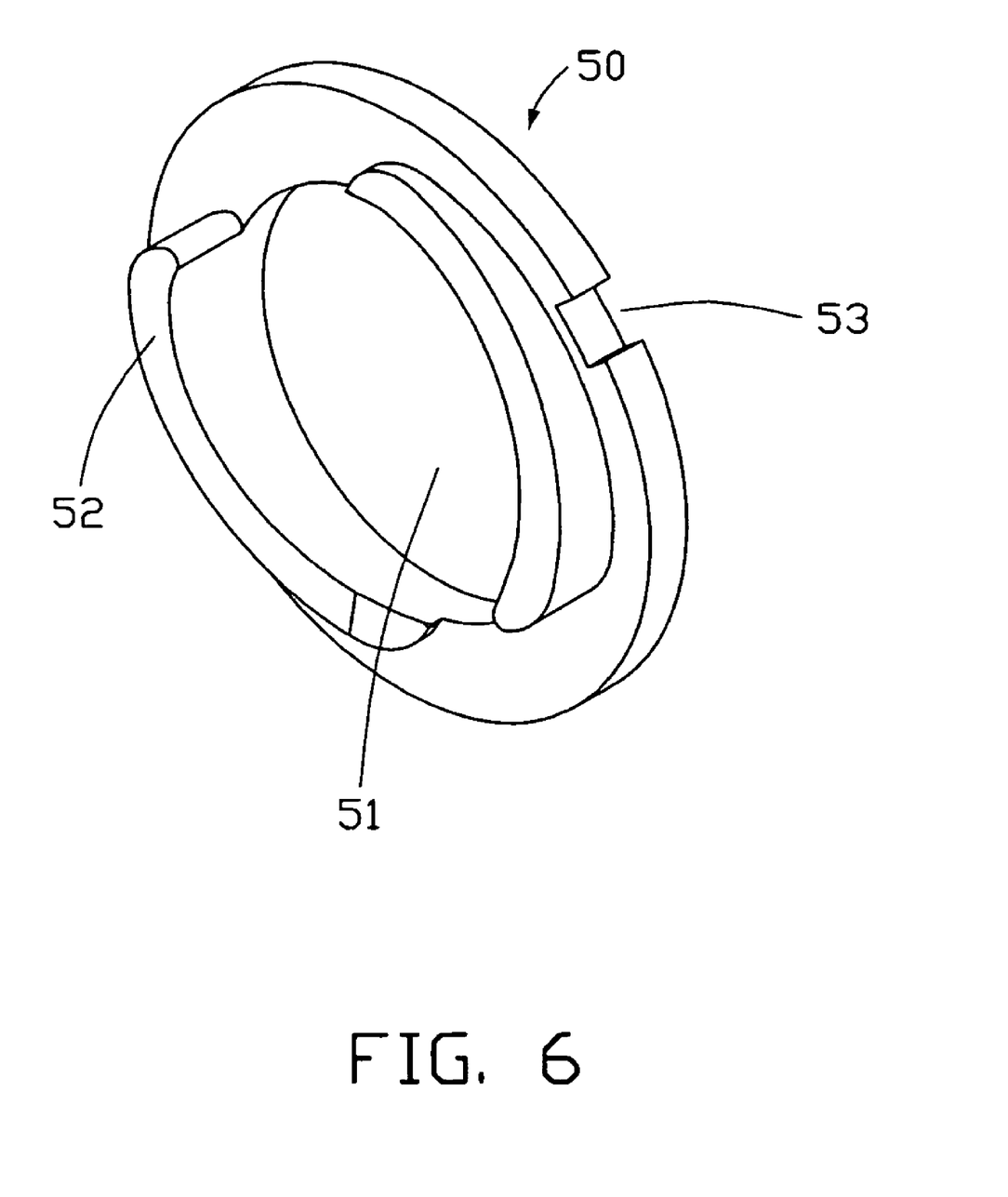
FIG. 6 is an enlarged view of the ring in FIG. 2.

Also referring to FIG. 6, the latching ring 50 is substantially round. The latching ring 50 has a round hole 51 defined in a center thereof. The latching ring 50 has two symmetrically bulges 52 extending from one side thereof Each bulge 52 includes an end surface which is gradually elevated from jumping-off point to end point, thereby forming an arcuate surface. The bulges 52 with the inner thread 342 of the cam 30 cooperatively enclose a space to receive and resist the ball bearings 40 so as to prevent the ball bearings 40 from falling. The latching ring 50 has two symmetrical ring slots 53 defined in an outer periphery thereof so that the projections 36 of the cam 30 engage into the ring slots 53 of the latching ring 50.

The sleeve 60 is a substantially hollow cylinder in shape, and includes an open end and a half-closed end. Two long troughs 65 are defined in an inner wall of the sleeve 60. Accordingly, two sleeve blocks 66 are formed corresponding to the long troughs 65. The sleeve blocks 66 engage with the cover section 102 of the mobile phone 100. The engaging protrusions 35 of the cam 30 engage in the long troughs 65 so that the cam 30 and the sleeve 60 do not rotate relative to each other.

The washer 70 is O-shaped and is fixed in the resisting end 234 of the shaft 20.

Figure 7:
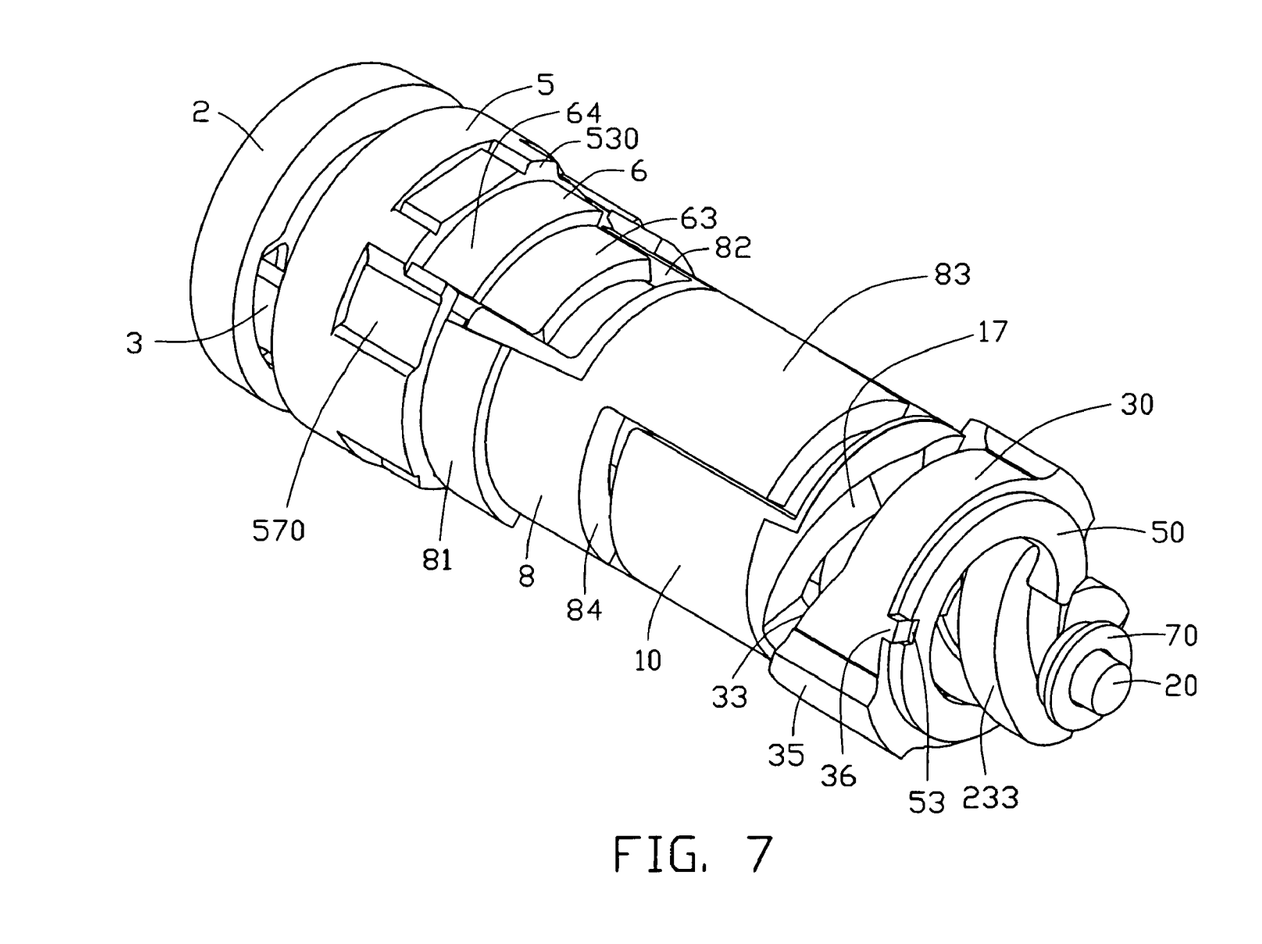
FIG. 7 is an assembled view showing the hinge assembly without the sleeve in FIG. 2.
Figure 8:
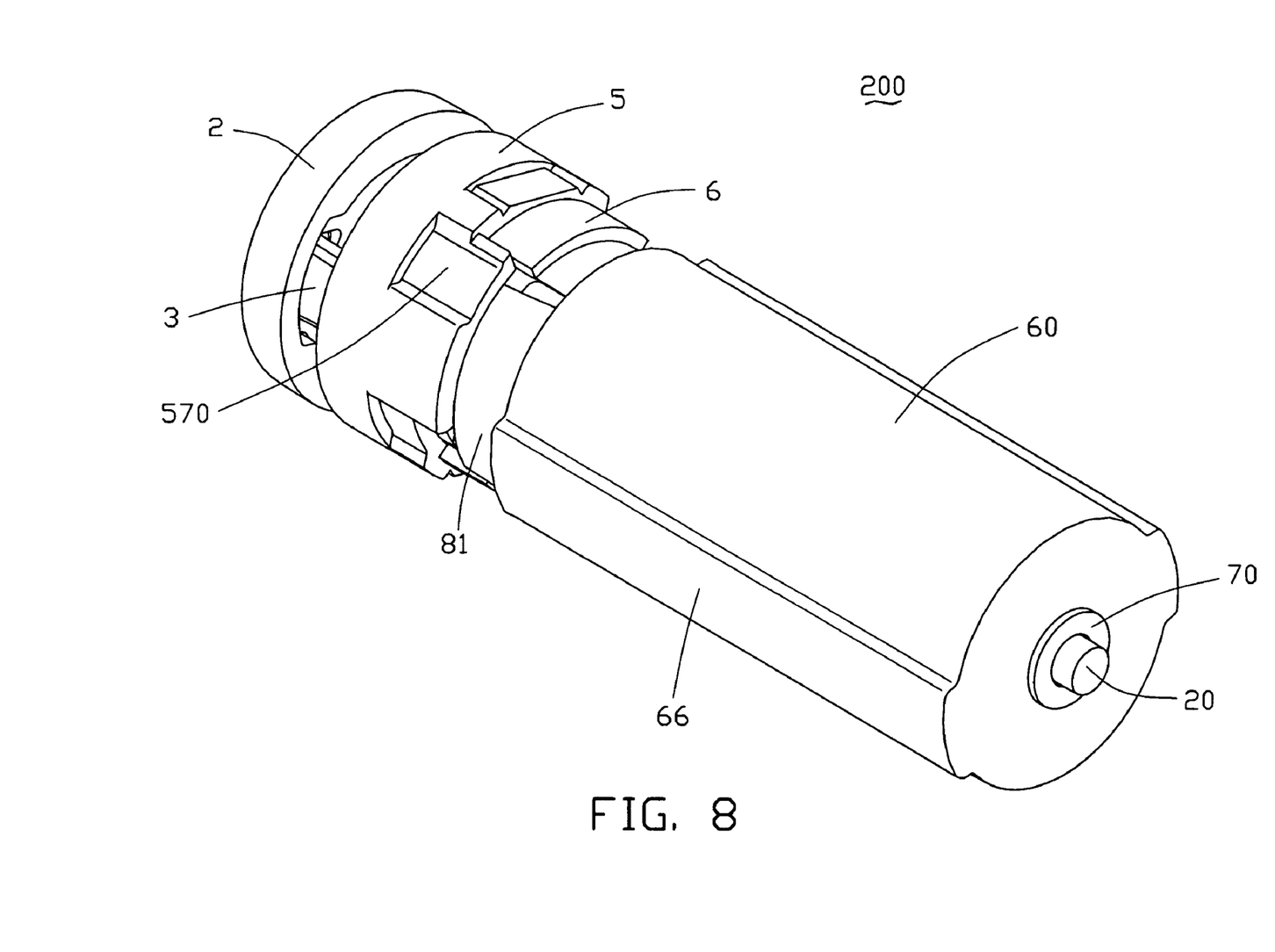
FIG. 8 is similar to FIG. 7, but showing the hinge assembly with the sleeve.
Figure 9:
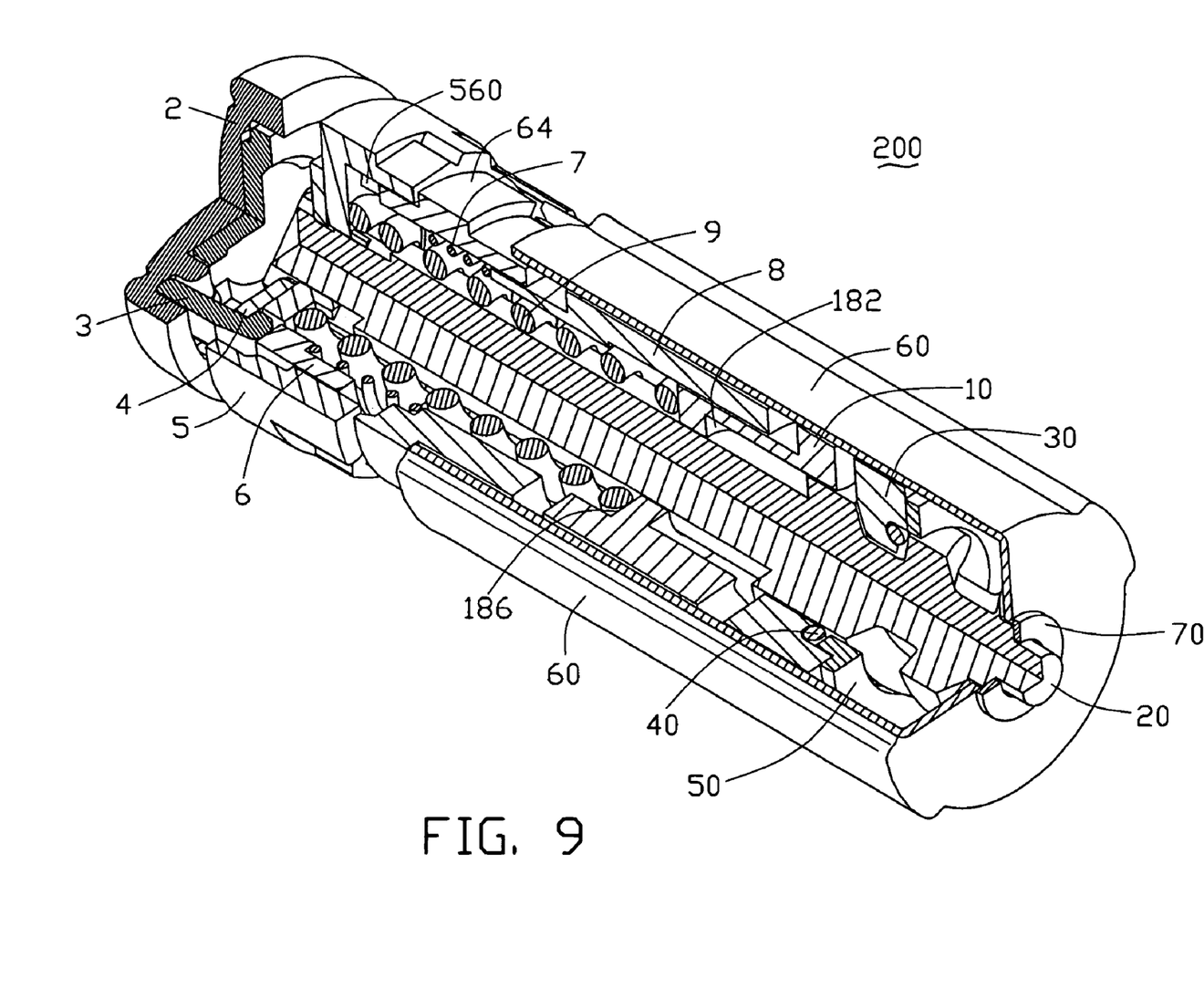
FIG. 9 is a cut-away view of FIG. 8.

In assembly, referring to FIGS. 7 to 9, the ball bearing 40 is received into the containing groove 37 of the cam 30, and the latching ring 50 covers the ball bearing 40. At the same time, the projections 36 of the cam 30 are locked into the ring slots 50 of the latching ring 50 so that the latching ring 50 is fixed in the cam 30 and prevents the ball bearings 40 from falling off/out. Then, the assembled cam 30 is threaded onto the end shaft 23, with the outer screw thread 233 of the end shaft 23 being engaged with the inner screw thread 342 of the cam 30. Accordingly, the ball bearings 40 directly contact with the outer screw thread 233 of the shaft 20 and the inner screw thread 342 of the cam 30. Sliding friction is thus changed to rotational friction and thus greatly reduced by means of the ball bearings 40.

After the cam 30 is placed around the end shaft 23, the follower 10 passes through the deformed shaft 21 of the shaft 20, with the cam surface 17 of the follower 10 engaging with the latching cam surface 33 of the cam 30. The second spring 9 is placed around the shaft 20, with one end of the second spring 9 resisting the step in the stepped hole 18 of the follower 10. Then, the extending walls 83 of the locking member 8 engage in the notches 16 of the follower 10, and the latching portion 15 of the follower 10 are inserted into the recesses 84 of the locking member 8 so that the locking member 8 is locked with the follower 10.

The control member 6, the first spring 7 are placed in order around the shaft 20. One end of the first spring 7 resists the stepped wall 81 of the locking member 8, the other end of the first spring 7 resists the latching wall 62 of the control member 6. The protruding posts 63 of the control member 6 engage in the latching grooves 82 of the locking member 8 so that the control member 6 is fixed together with the locking member 8. Then, the fixing seat 5 is placed around the shaft 20 so that an opposite end of the second spring 9 resists the bottom wall 520 of the fixing seat 5. The deformed shaft 21 of the shaft 20 partially extends out from the axis hole 540 of the fixing seat 5. The blocks 560 of the fixing seat 5 engage in the receiving grooves 61 of the control member 6, and the ribs 64 of the control member 6 engage in the openings 530 of the fixing seat 5, thereby limiting the control member 6 to rotate relative to the fixing seat 5.

The retaining member 4 is locked into the annular groove 212 of the deformed shaft 21. Accordingly, the above elements are fixed to the shaft 20. The protrusions 230 of the cap 2 are inserted into the button holes 32 of the button 3. Then, the button 3 is adhered to the cap 2 such that the button 3 is fixed with the cap 2. The claws 31 of the button 3 are inserted into the slots 550 of the fixing seat 5, thereby the claws 31 of the button 3 are locked into the latching walls 62 of the control member 6.

The above-mentioned assembled elements are received into the sleeve 60 along one end of the assembled elements with the cam 30. The engaging protrusions 35 of the cam 30 engage in the troughs 65 of the sleeve 60, and the resisting end 234 extends out from the half-closed end of the sleeve 60. The washer 70 is tightly engaged on the resisting end 234 of the shaft 20. Accordingly, the hinge assembly 200 is thus completely assembled, as shown in FIG. 8.

Once the individual hinge component are assembled as described above, the hinge assembly 200 provides a self-contained component that can be sold as an off-the-shelf component or directly incorporated into a mobile phone or other device during manufacture. If incorporated into a mobile phone during manufacture, the sleeve blocks 66 of the sleeve 60 can engage in a cavity (not shown) of the cover section 102 of the mobile phone 100, and the reversing grooves 570 of the fixing seat 5 connect with the body section 104 of the mobile phone 100. When the cover section 102 of the mobile phone 100 is in a fully closed position, the second spring 9 has a predetermined pressure. The predetermined pressure of the second spring 9 is exerted on the follower 10 and passed to the cam 30 so that the cam 30 has a rotation tendency relative to the outer screw thread 233 of the end shaft 23. However, the cam 30 is prevented from rotating by the control member 6.

In use, when a user wants to open the cover section 102 of the mobile phone 100 automatically, he/she may press the cap 2. In this process, the cap 2 brings the button 3 to move along an axial direction, the claws 31 of the button 3 then push the latching walls 62 of the control member 6. The control member 6 moves axially, compressing the first spring 7 toward the cam 30. When the latching walls 62 of the control member 6 break away from the limitation of the blocks 560 of the fixing seat 5, the cam 30 rotates relative to the shaft 20 along the outer screw thread 233 under the second spring 9. The inner screw thread 342 of the cam 30 moves the ball bearings 40 so that the ball bearings 40 contact the outer screw thread 233 of the end shaft 23. Accordingly, the sliding friction between the cam 30 and the shaft 20 is changed to the rotating friction, and the abrasion between the outer screw thread 233 and the inner screw thread 342 is thus greatly decreased.

When the cam 30 rotates, the follower 10, the locking member 8, the first spring 7 and the control member 6 move and rotate. Furthermore, the cam 30 brings the sleeve 60 to rotate so that the cover section 102 of the mobile phone 100 is opened. The cam 30 stops rotating when the cover section 102 of the mobile phone 100 is completely opened. The elastic potential energy of the first spring 7 then reversely pushes the control member 6 to move toward the cap 2. Accordingly, the latching walls 62 of the sleeve 60 are locked between the blocks 560 of the fixing seat 5.

When the cover section 102 of the mobile phone 100 is being closed, the cover section 102 causes the sleeve 60 to rotate relative to the body section 104. The sleeve 60 further brings the cam 30 to rotate relative to the outer screw thread of the end shaft 23. Because the control member 6 is locked into the blocks 560 of the fixing seat 5, the control member 6 cannot rotate relative to the fixing seat 5. Accordingly, the locking member 8 and the follower 10 do not rotate relative to the fixing seat 5. Thus, the cam 30 rotates relative to the follower 10. When the cam rotates, the follower 10 is pushed toward the cap 2. When the cam 30 passes over the peaks 172 of the follower 10, the second spring 9 accumulates elastic potential energy. When it stops exerting force, the cam 30 automatically slides to the valleys 173 of the follower 10 along the cam surface 17 of the follower 10. Accordingly, the cover section 102 becomes closed relative to the body section 104 of the mobile phone 100. The hinge assembly 200 may be opened manually. The principles of the manual opening process are basically the same as the manual closing process.

In an alternative embodiment, the first spring 7 and the second spring 9 may be replaced by other elastic elements such as elastic sponge.

In an alternative embodiment, the cap 2 may be omitted.

In an alternative embodiment, the locking member 8 may be omitted. Accordingly, the control member 6 directly contacts with the follower 10, and the first spring 7 and the second spring 9 directly resist the follower 10.

As described above, the present invention provides a hinge assembly 200 for use with various portable devices, beyond the mobile phone illustrated, and/or with other devices needing a hinge assembly that selectably facilitates the achievement of fully open and fully closed positions.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

We claim:

1. A hinge assembly, comprising:
a button having at least one pushing portion;
a fixing seat having at least one block, the button movably positioned to the fixing seat, each pushing portion extending through the fixing seat;
a control member having at least one receiving groove, the at least one block being received in the at least one receiving groove, the at least one pushing portion resisting the control member, the fixing seat releasably engaging with the control member;
a first spring providing an elastic force to the control member;
a follower having a cam surface, the control member engaged with the follower;
a cam having a latching cam surface, the cam including a cam hole having an inner circumferential wall, the inner circumferential wall defining an inner screw thread;
a second spring providing an elastic force to make the cam surface of the follower and the latching cam surface of the cam resist each other; and
a shaft having an end shaft, the end shaft defining an outer screw thread, the outer screw thread engaging with the inner screw thread of the cam.

2. The hinge assembly as claimed in claim 1, further comprising a set of ball bearings, wherein the cam has a containing groove, the ball bearings are received in the containing groove.

3. The hinge assembly as claimed in claim 2, further comprising a latching ring, the latching ring covers the containing groove.

4. The hinge assembly as claimed in claim 3, wherein the cam disposes at least one projection, the latching ring defines at least one ring slot, each projection is received in each ring slot.

5. The hinge assembly as claimed in claim 4, wherein the latching ring disposes two bulges at one side, each bulge includes an end surface which is gradually elevated from a jumping-off point to an end point.

6. The hinge assembly as claimed in claim 1, further comprising a locking member, wherein the locking member non-rotatably connects with the control member and the follower.

7. The hinge assembly as claimed in claim 6, wherein the first spring is disposed between the locking member and the control member.

8. The hinge assembly as claimed in claim 7, wherein the control member has at least one protruding post extending from one end, the locking member has at least one latching groove, and each protruding post is received in the latching groove.

9. The hinge assembly as claimed in claim 8, wherein the locking member has a stepped wall adjacent to the latching groove, a diameter of the first spring is larger than that of an inner wall of the stepped wall, and smaller than that of an outer wall of the stepped wall, and the first spring resists the stepped wall.

10. The hinge assembly as claimed in claim 9, wherein the locking member has at least one extending wall opposite to the stepped wall, the follower has at least one notch opposite to the cam surface, and each extending wall is received in a corresponding notch.

11. The hinge assembly as claimed in claim 1, wherein the shaft includes a deformed shaft portion, and the fixing seat is fixed in the deformed shaft portion.

12. A hinge assembly of a foldable electronic device comprising a main body and a flip cover, the hinge assembly comprising:
a hinge shaft comprising an outer screw thread thereon;
a cam attached around the hinge shaft, the cam having an inner screw thread formed on an inner periphery thereof, the inner screw thread engaging with the outer screw thread in a manner such that the cam tends to rotate with respect to the hinge shaft upon being pushed axially, the cam having a first cam surface formed on one end thereof, the cam being configured so as to be fixed relative to one of the main body and the flip cover;
a cam follower attached around the hinge shaft, the cam follower having a second cam surface engaging with the first cam surface;
an elastic member biasing the cam follower against the cam;
a fixing seat configured so as to be fixed relative to the other of the main body and the flip cover;
a control member fixed relative to the cam follower, the control member releasably received in the fixing seat, the control member being movable between a locked position where the control member is engaged with the fixing seat in a manner so as to prevent the control member from rotating relative to the fixing seat, and an unlocked position where the control member is released and is movable relative to the fixing seat; and
another elastic member biasing the control member toward the fixing seat.

13. The hinge assembly as claimed in claim 12, further comprising a locking member, wherein the locking member non-rotatably connects with the control member and the follower.

14. A foldable electronic device having at least two components hinged together by a hinge assembly, the hinge assembly comprising:
a button having at least one pushing portion;
a fixing seat having at least one block, the button movably positioned to the fixing seat, each pushing portion passing through the fixing seat;
a control member having at least one receiving groove, the block received in each receiving groove, each pushing portion resisting the control member, the fixing seat releasably engaging with the control member;
a first spring providing an elastic force to the control member;
a follower having a cam surface, the control member engaged with the follower;
a cam having a latching cam surface, the cam including an axis hole having an inner circumferential wall, the inner circumferential wall defining an inner screw thread;
a second spring providing an elastic force to make the cam surface of the follower and the latching cam surface of the cam resist each other; and
a shaft having an end shaft, the end shaft defining an outer screw thread, the outer screw thread engaging with the inner screw thread of the cam.

15. The foldable electronic device as claimed in claim 14, wherein the hinge assembly further comprises a locking member, and the locking member non-rotatably connects with the control member and the follower.

16. The foldable electronic device as claimed in claim 15, wherein the first spring is disposed between the locking member and the control member.

17. The foldable electronic device as claimed in claim 16, wherein the control member has at least one protruding post extending from one end, the locking member has at least one latching groove, and each protruding post is received in the latching groove.

18. The foldable electronic device as claimed in claim 17, wherein the locking member has a stepped wall adjacent to the latching groove, a diameter of the first spring is larger than that of an inner wall the stepped wall, and smaller than that of an outer wall of the stepped wall, and the first spring resists the stepped wall.

19. The foldable electronic device as claimed in claim 18, wherein the locking member has at least one extending wall opposite to the stepped wall, the follower has at least one notch opposite to the cam surface, and each extending wall is received in a corresponding notch.

* * * * *

UNITED STATES PATENT AND TRADEMARK OFFICE
CERTIFICATE OF CORRECTION

PATENT NO. : 7,627,930 B2
APPLICATION NO. : 11/384471
DATED : December 8, 2009
INVENTOR(S) : Duan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 782 days.

Signed and Sealed this

Second Day of November, 2010

David J. Kappos
*Director of the United States Patent and Trademark Office*